United States Patent Office 3,294,494
Patented Dec. 27, 1966

3,294,494
METHOD FOR REMOVING LANTHANIDES AND TRIVALENT ACTINIDES FROM AQUEOUS NITRATE SOLUTIONS
Fletcher L. Moore, Knoxville, Tenn., assignor to the United States of America as represented by the United States Atomic Energy Commission
No Drawing. Filed Feb. 28, 1966, Ser. No. 532,534
9 Claims. (Cl. 23—340)

The invention described herein was made in the course of, or under, a contract with the United States Atomic Energy Commission.

My invention relates to liquid-liquid extraction methods of removing lanthanides and trivalent actinides from aqueous solutions and separating them from each other.

Solvent extraction processes are especially useful in separating highly radioactive elements from each other and from non-radioactive elements and such processes have been developed for segregating elements of the trivalent actinide and lanthanide groups. A typical process is described in U.S. Patent No. 3,178,256, issued April 13, 1965, in my name, for "Method for Separating Transplutonium Elements from Rare Earth Fission Products." The process described therein requires the presence of a high concentration of lithium chloride in the aqueous phase, necessitating the conversion from a nitrate system (waste solutions from reactor fuel processing operations normally contain nitrate as the predominant anion) to a chloride system and the addition of large quantities of salts to the aqueous phase. Copending coassigned U.S. patent application Serial No. 397,664, filed September 18, 1964, for "Method of Separating Members of Actinide and Lanthanide Groups," teaches a method of separating these elements using as an extractant a quaternary ammonium thiocyanate. This process does not require the presence of a high concentration of metal salts in the aqueous phase. However, little separation of americium from curium can be achieved by this method, and it requires that thiocyanate values be incorporated in the aqueous phase.

It is accordingly one object of my invention to provide a liquid-liquid extraction method of removing trivalent actinide and lanthanide values from an aqueous phase which does not require the presence of a high concentration of metal salts in the aqueous phase.

It is another object to provide such a process which is compatible with an aqueous phase containing nitrate as the predominant anion.

It is still another object to provide a liquid-liquid extraction process having a high americium-curium separation factor.

Other objects of my invention will be apparent from the following detailed description and the claims appended thereto.

In accordance with my invention I have provided a method of removing metal values selected from lanthanides and trivalent actinides from an acidic aqueous solution containing said values together with a nitrate salt comprising contacting said aqueous solution with an organic solution of a quaternary ammonium compound and separating the resulting metal value-containing organic solution from the resulting aqueous phase.

By my process not only can lanthanides and trivalent actinides be extracted from an aqueous solution, but these elements can be separated from each other, and excellent separation of americium from curium can be obtained. Separation of yttrium and the lanthanide elements having atomic numbers 64 to 71 can also be separated from the lanthanides having atomic numbers of 57 to 63. These results may be achieved by extraction from an aqueous phase containing a relatively low concentration of nitrate, which means that normally little if any change in the salt content of a reactor fuel processing solution is required before these elements can be removed from such a solution.

Removal of the trivalent actinides and lanthanides from the aqueous phase is also accompanied by excellent separation of these elements from corrosion products and some fission products. Some of the virtually non-extractable elements are iron, chromium, aluminum, nickel, cesium, strontium, barium, yttrium, zirconium, and niobium.

In the first step of my process an acidic aqueous solution containing elements of the trivalent actinides and lanthanides together with extraneous impurities and a nitrate salt is contacted with an organic solution of a quaternary ammonium salt.

Any quaternary ammonium compound having high organic and low aqueous solubility may be used in my process and these conditions are met by compounds containing from 17 to 49 carbon atoms. The compound may be represented by the formula

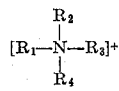

where $R_1$, $R_2$, $R_3$, and $R_4$ are selected from the group consisting of aryl and alkyl radicals. These radicals may contain substituents which do not increase the water solubility of the compound to an appreciable extent. The preferred compounds are those wherein the radicals are saturated hydrocarbons at least three of which contain at least 5 carbon atoms each. The compounds wherein three of the radicals are saturated hydrocarbon chains containing from 8 to 10 carbon atoms each and the remaining radical is a methyl group are particularly useful.

The quaternary ammonium salt may be used in either the chloride or the nitrate form. While the chloride form affords excellent extraction of the lanthanide and trivalent actinide elements from nitrate solutions, the separation of these elements from iron, zinc, silver, zirconium, and niobium is not as effective using the chloride salt as the nitrate salt because these elements form extractable chloro anions. For this reason, as well as for the reason that the presence of chloride introduces corrosion problems, nitrate is the preferred form of the quaternary ammonium salt.

Any organic compound which will dissolve the quaternary ammonium compound and not form interfering complexes may be used as the organic diluent. Typically useful diluents are the aromatic solvents such as xylene, toluene, benzene, and diethylbenzene; the aliphatic hydrocarbons such as kerosene; the ketones such as methylisobutyl ketone and diisobutyl ketone; and alcohols such as diisobutyl carbinol.

The extraction power of the organic solution for the lanthanides and the trivalent actinides increases with an increase in the concentration of the quaternary amine in the organic solvent; however, the degree of separation of one member from another is not significantly changed by amine concentration. The concentration of the quaternary ammonium compound in the organic phase may suitably range from 50 to 400 grams per liter, and is preferably in the range of 200 to 300 grams per liter.

The aqueous phase contacted with the quaternary ammonium salt must contain nitrate as the predominant anion. The concentration of nitrate salt may suitably range from 0.5 normal to 5.0 normal. The term "nitrate salt" indicates the nitrate in excess of that present as nitric acid. Specific process goals, i.e., removal of all these elements from an aqueous solution, or separation of one from another, may determine the nitrate salt concentration. Normally an increase in nitrate salt concentration increases the extractability of these elements and decreases the separation factor of one over another. Typically the preferred concentration of nitrate for bulk extraction of these elements is from 1.5 to 5.0 normal, and the preferred concentration of nitrate for separation of at least one member of the group consisting of lanthanides and trivalent actinides from other members is from 0.5 to 2.5 normal.

The nitrate may be furnished in the form of any metal nitrate conventionally useful as a salting agent in liquid-liquid extraction processes. The most useful salts are lithium, aluminum, and ammonium nitrates, and aluminum nitrate is the preferred salt since it is often present in reactor fuel processing solutions and introduces no neutron hazard as does lithium.

The concentration of acid in the aqueous phase may suitably range from 0.01 normal to 1.5 normal. An increase in acid concentration generally decreases the extraction power for a specific element, but increases the separation factors. The preferred acid concentration for bulk extraction of all these elements from an aqueous phase is 0.01 to 0.5 normal, and the preferred acid concentration for optimum separation of one from the other is 0.2 to 1.5 normal. The optimum concentration of acid for a specific process will depend to some extent upon the concentration of nitrate salt in the aqueous phase.

TABLE I

| Example No. | Concentration of $Al(NO_3)_3$ (normality) | Percent of Tracer Extracted | |
|---|---|---|---|
| | | $^{241}$Americium | $^{152-4}$Europium |
| I | 3.0 | 99.8 | 82.7 |
| II | 0.6 | 6.9 | 2.2 |
| III | 1.2 | 30.0 | 12.5 |
| IV | 1.8 | 61.6 | 33.8 |
| V | 2.4 | 89.7 | 62.1 |
| VI | 3.6 | >99.9 | 92.9 |
| VII | 4.2 | >99.9 | 97.5 |
| VIII | 4.8 | >99.9 | 98.8 |

*Examples IX–XVI*

Experiments were run to determine the extraction power of the quaternary ammonium salts for various lanthanides and actinides from a solution 2.4 normal in aluminum nitrate. The only variation between the examples was in the concentration of nitric acid. Table II gives the resulting data. The organic extractant was a 30 percent solution of tricaprylmethylammonium nitrate in xylene.

TABLE II
[Extraction of Various Elements from a 2.4 N Aluminum Nitrate Solution with a Quaternary Ammonium Nitrate]

| Example No. | $HNO_3$.N | $^{241}$Am | $^{244}$Cm | $^{249}$Bk | $^{252}$Cf | $^{144}$Ce | $^{148}$Pm | $^{152-4}$Eu | $^{91}$Y | $^{170}$Tm | $^{59}$Fe | Al | $^{95}$Zr-$^{95}$Nb |
|---|---|---|---|---|---|---|---|---|---|---|---|---|---|
| IX | 0.02 | 90.6 | 65.9 | 68.9 | 72.2 | 97.0 | 81.3 | 62.4 | 16.6 | 20.9 | 0.7 | 0.2 | 1.4 |
| X | 0.2 | 80.3 | 53.4 | 56.0 | 63.8 | 95.6 | 74.3 | 51.1 | 9.4 | 12.1 | 0.2 | 0.1 | 4.9 |
| XI | 0.3 | 72.8 | 44.4 | 50.4 | 56.1 | 94.4 | 67.8 | 43.6 | 7.2 | 8.8 | <0.01 | 0.06 | 4.0 |
| XII | 0.4 | 63.6 | 37.7 | 41.4 | 50.4 | 92.6 | 63.0 | 36.5 | 6.0 | 7.1 | <0.01 | 0.02 | 3.6 |
| XIII | 0.7 | 45.9 | 22.8 | 29.4 | 36.8 | 84.7 | 43.8 | 25.0 | 3.3 | 4.0 | <0.01 | 0.01 | |
| XIV | 0.8 | 35.3 | 16.9 | 22.4 | 30.7 | 78.2 | 35.5 | 19.0 | 2.6 | 2.7 | <0.01 | 0.01 | |
| XV | 1.0 | 26.9 | 11.6 | 17.8 | 23.7 | 71.0 | 25.8 | 14.2 | 1.8 | 2.1 | <0.01 | <0.01 | |
| XVI | 1.2 | 17.3 | 8.1 | 12.9 | 18.7 | 54.3 | | 10.0 | 1.4 | 1.6 | <0.01 | <0.01 | |

The organic phase, loaded with extracted lanthanide and actinide values, is then separated from the aqueous phase. This separation may be effected by any method useful in liquid-liquid extraction processes.

The extracted values may be removed from the organic phase by contacting the loaded organic phase with water or an aqueous solution of a mineral acid such as nitric, sulfuric, or hydrochloric acid. The particular acid used may be dictated by the nature of the next succeeding step in processing the actinides and lanthanides.

Having thus described my invention the following examples are offered to illustrate it in more detail.

*Example I*

An aqueous solution 0.02 normal in nitric acid and containing tracer quantities of $^{241}$Am and $^{152-4}$Eu was made 3.0 normal in $Al(NO_3)_3$. This solution was contacted with an equal volume of 30 percent tricaprylmethylammonium nitrate in xylene. Analyses of the two phases showed that 99.8 percent of the americium and 82.7 percent of the europium were extracted.

This example shows the high extraction power of a quaternary ammonium salt for americium and europium from an aqueous solution containing a moderate concentration of a nitrate salt.

Under identical conditions the tertiary amines such as tricaprylamine, the tertiary analog of the quaternary ammonium compound used in Example I, showed negligible extraction of trivalent actinides and lanthanides and, in general, the secondary and primary amines did not extract as well as the tertiary amines.

Examples II–VIII were duplicates of Example I except that the concentration of aluminum nitrate was varied. The data for these examples together with the data for Example I are given in following Table I.

As can be seen from the data of Table II the extractability of the lanthanides and actinides decreases with an increase in the concentration of nitric acid; however, separation of these elements from each other normally increases with an increase in acidity at least up to a concentration of about 1.0 molar. The concentrations of nitric acid and nitrate salt in the aqueous phase may be dictated by either the desire to have a high extraction power or a high separation factor. It should be noted that even at an aluminum nitrate concentration as high as 2.4 normal the difference in amounts of americium and curium extracted is great enough to effect a separation of these two elements with ease. If a higher separation factor is desired the concentration of aluminum nitrate may be decreased.

The above examples are intended to be illustrative only, and it is obvious that variations from the conditions set forth therein may be made without departing from the spirit of my invention.

I claim:

1. A method of removing metal values selected from lanthanide and trivalent actinides from an aqueous acidic solution containing said values together with a nitrate salt comprising contacting said aqueous solution with an organic solution of a quaternary ammonium compound containing from 17 to 49 carbon atoms, and separating the resulting metal value-containing organic solution from the depleted aqueous phase.

2. The method of claim 1 wherein the acidic aqueous solution contains nitric acid in a concentration of 0.01 to 1.5 normal, and a nitrate salt in a concentration of 0.5 to 5.0 normal.

3. The method of claim 1 wherein the acidic aqueous solution contains nitric acid in a concentration of 0.01 to 0.5 normal, and a nitrate salt in a concentration of 1.5 to 5.0 normal.

4. The method of claim 1 wherein the acidic aqueous solution contains nitric acid in a concentration of 0.2 to 1.5 normal, and a nitrate salt in a concentration of 0.5 to 2.5 normal.

5. The method of claim 4 wherein americium is separated from curium.

6. The method of claim 1 wherein the quaternary ammonium compound is in the nitrate form.

7. The method of claim 1 wherein the quaternary ammonium compound is tricaprylmethylammonium nitrate.

8. The method of claim 1 wherein the nitrate salt is aluminum nitrate.

9. The method of claim 1 wherein the acidic aqueous solution contains nitric acid in a concentration of 0.1 to 1.5 normal and aluminum nitrate in a concentration of 0.5 to 5.0 normal, and the quaternary ammonium compound is represented by the formula

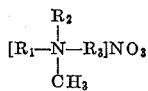

where $R_1$, $R_2$, and $R_3$ are saturated hydrocarbon chains containing from 8 to 10 carbon atoms each.

References Cited by the Examiner

UNITED STATES PATENTS 3,223,476  12/1965  Hart _____ 23—340

References Cited by the Applicant

AEC publication TID–12665.

L. L. Burgec et al., Amine Systems in Solvent Extraction, "Aqueous Reprocessing Chemistry for Irradiated Fuels," pp. 83–103, 1963.

L. DEWAYNE RUTLEDGE, *Primary Examiner.*

S. TRAUB, *Assistant Examiner.*